US010769457B1

(12) United States Patent
Diehl et al.

(10) Patent No.: US 10,769,457 B1
(45) Date of Patent: Sep. 8, 2020

(54) SYSTEM AND METHOD FOR DETECTING AIRBORNE OBJECTS

(71) Applicant: Pony AI Inc., Grand Cayman (KY)

(72) Inventors: Peter G. Diehl, Shanghai (CN); Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/584,758

(22) Filed: Sep. 26, 2019

(51) Int. Cl.
| *G06K 9/00* | (2006.01) |
| *B60W 30/09* | (2012.01) |
| *G01S 17/89* | (2020.01) |
| *G01S 17/93* | (2020.01) |
| *G01S 17/42* | (2006.01) |
| *B60W 30/095* | (2012.01) |

(52) U.S. Cl.
CPC ......... *G06K 9/00805* (2013.01); *B60W 30/09* (2013.01); *B60W 30/0956* (2013.01); *G01S 17/42* (2013.01); *G01S 17/89* (2013.01); *G01S 17/93* (2013.01)

(58) Field of Classification Search
CPC ..... G06K 9/00805; G01S 17/89; G01S 17/93; G01S 17/42; B60W 30/0956; B60W 30/09
USPC ............ 340/425.5, 435, 436, 933, 936, 937
See application file for complete search history.

(56) References Cited

U.S. PATENT DOCUMENTS

| 2003/0114972 | A1* | 6/2003 | Takafuji ............... B60R 21/0134 701/45 |
| 2010/0128110 | A1* | 5/2010 | Mavromatis ..... G08B 13/19641 348/47 |
| 2015/0302586 | A1* | 10/2015 | Fukata ................... G08G 1/165 382/103 |
| 2017/0120902 | A1* | 5/2017 | Kentley ................ B60W 10/04 |
| 2017/0219319 | A1 | 8/2017 | Miller et al. |
| 2018/0009403 | A1* | 1/2018 | Yamazaki .......... G06K 9/00791 |
| 2018/0141544 | A1* | 5/2018 | Xiao ................... B60W 30/095 |
| 2019/0064811 | A1 | 2/2019 | Du et al. |
| 2019/0066397 | A1 | 2/2019 | Du et al. |
| 2019/0087635 | A1* | 3/2019 | Klaus ................. H04N 5/23299 |
| 2019/0311625 | A1* | 10/2019 | Anvari ................. G01S 13/878 |

* cited by examiner

*Primary Examiner* — Daryl C Pope
(74) *Attorney, Agent, or Firm* — Sheppard Mullin Richter & Hampton LLP

(57) ABSTRACT

Provided herein is a system and method that detects an airborne object and determines a driving action based on the airborne object. The system comprises one or more sensors; one or more processors; a memory storing instructions that, when executed by the one or more processors, causes the system to perform detecting an airborne object within a detection radius of a vehicle. In response to detecting the airborne object, the system performs tracking the airborne object to obtain 3-D coordinate information of the airborne object at distinct times, determining a probability that the airborne object will collide with the one or more sensors based on the 3-D coordinate information, determining a driving action of a vehicle based on the determined probability, and performing the driving action.

20 Claims, 20 Drawing Sheets

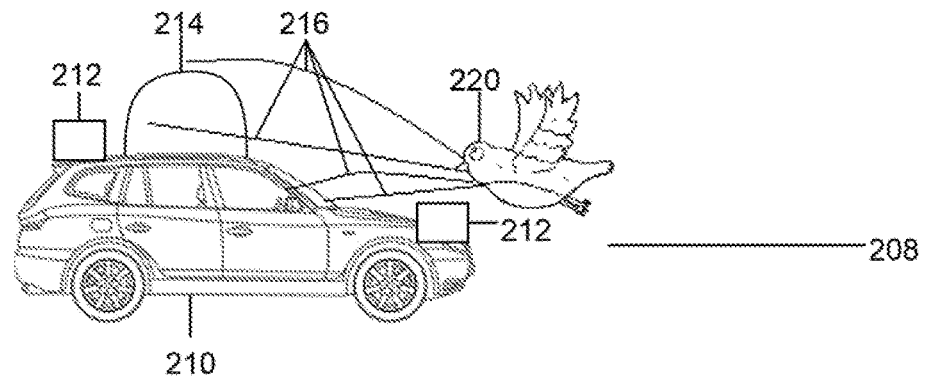
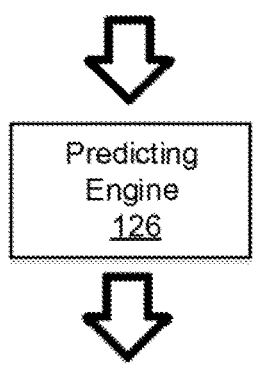
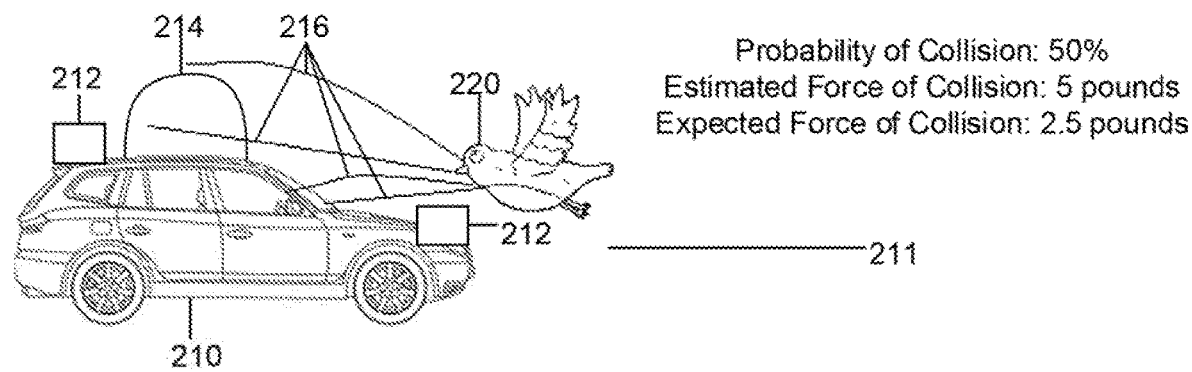
FIG. 2B

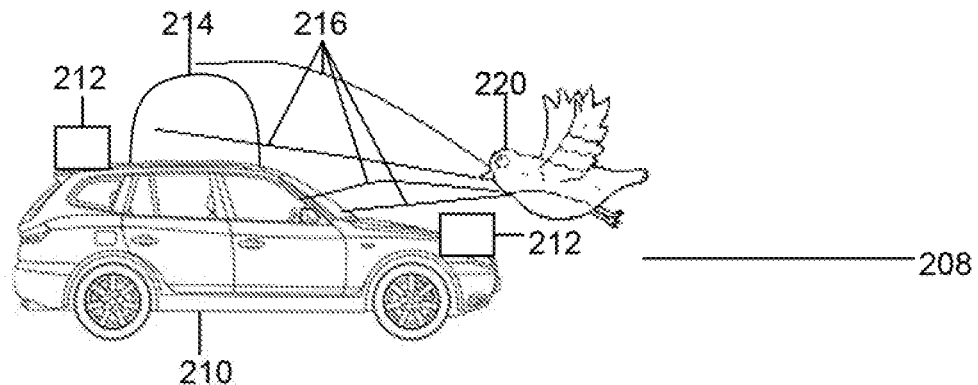
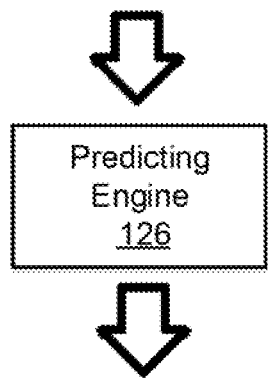
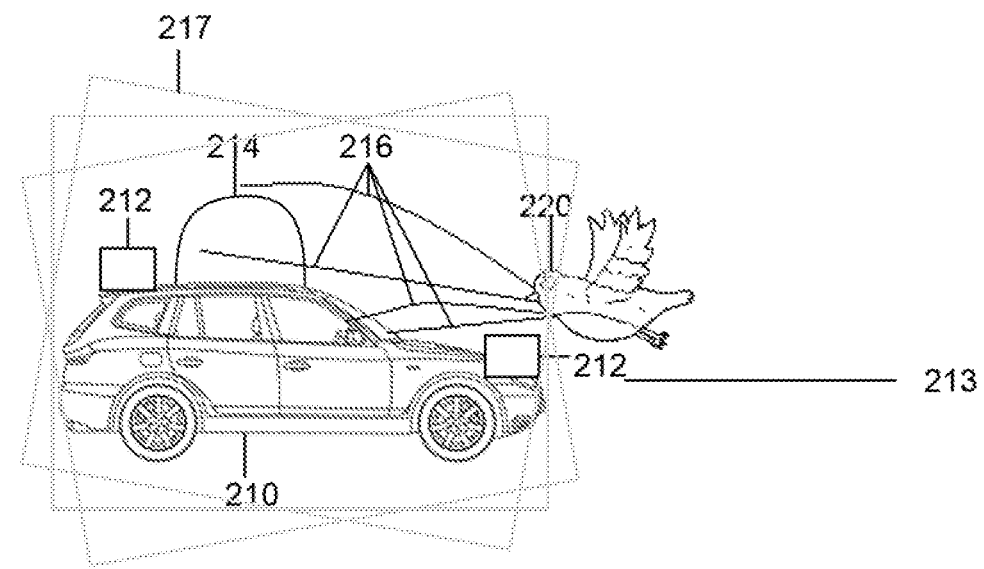
FIG. 2C

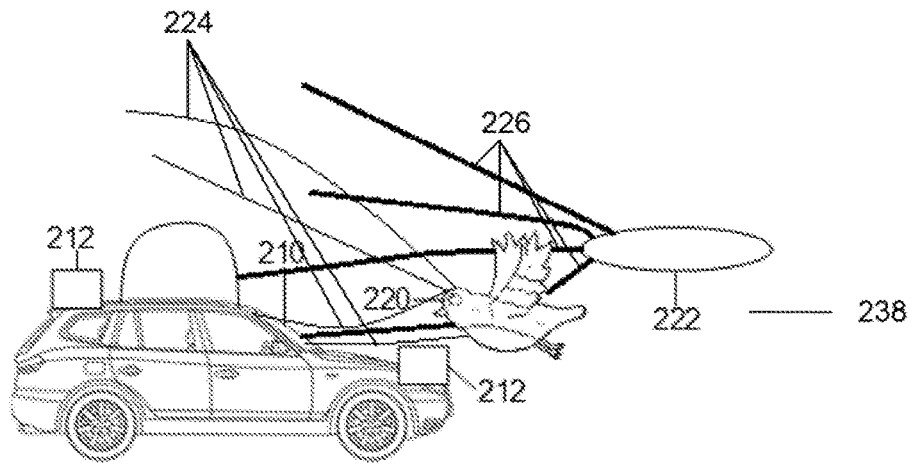
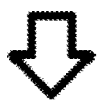
Predicting Engine 126
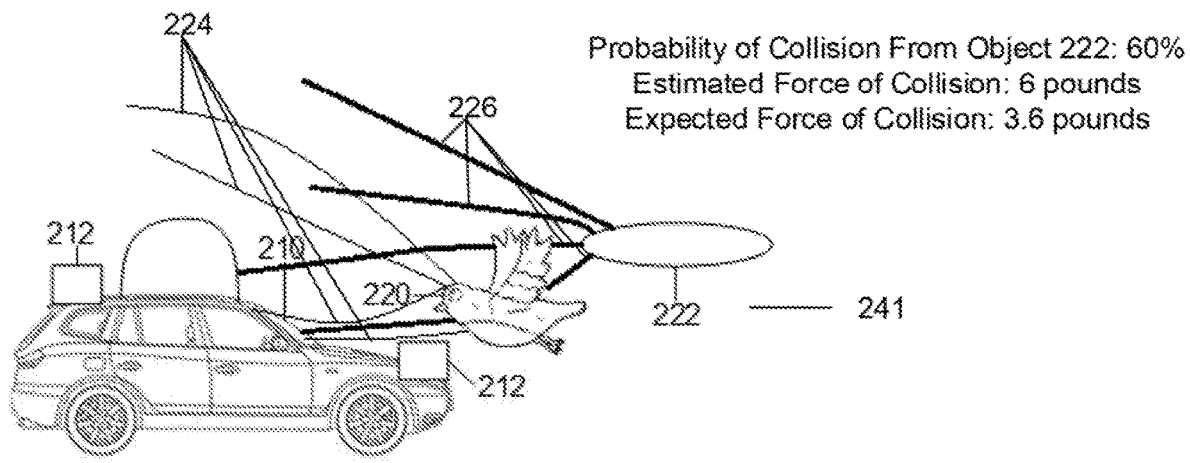
FIG. 2G

SYSTEM AND METHOD FOR DETECTING AIRBORNE OBJECTS

TECHNICAL FIELD

The present disclosure relates generally to sensors in vehicles that detect airborne objects and perform one or more countermeasures to prevent damage resulting from the airborne objects colliding with the sensors of the vehicle or with the vehicle. In particular, the present disclosure relates to one or more processors that predict a likelihood or probability that an object will collide with a sensor or the vehicle and determine which countermeasure or action to perform based on the predicted probability.

BACKGROUND

On-board sensors in vehicles, such as autonomous vehicles (AVs), supplement and bolster the vehicle's field of vision by providing accurate sensor data. Sensor data is used, for example, in applications of blind spot detection, lane change assisting, read end radar for collision warning or collision avoidance, park assisting, cross-traffic monitoring, brake assisting, emergency braking, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. Often, on-board sensors are exposed to harsh environmental elements (e.g., large temperature swings, ultra violet radiation, oxidation, wind, moisture, etc.), which can prematurely shorten the sensors' lifetimes. Furthermore, mounting the sensors exterior to the vehicle subjects the sensors to an increased risk of impact from road debris and airborne objects such as birds that would damage the sensors. A sensor enclosure to house the sensors may partially reduce a risk of collision with road debris and airborne objects. However, an object colliding with the sensor enclosure may still damage to the sensor enclosure and reduce a field of view of the sensor enclosure. These shortfalls are addressed by the present inventions, which provides an efficient and effective system and method to protect sensors on a vehicle from airborne objects, or prevent the vehicle from harmful collisions with airborne objects.

SUMMARY

Described herein are systems and methods for detecting airborne objects, predicting a probability of the airborne objects colliding with a sensor or a vehicle, estimating an impact upon collision, and performing an action to prevent the collision based on the probability and/or the estimated impact.

Various embodiments of the present disclosure provide a system comprising one or more sensors; one or more processors; and a memory storing instructions that, when executed by the one or more processors, causes the system to perform: detecting an airborne object within a detection radius of a vehicle; in response to detecting the airborne object, tracking the airborne object to obtain 3-D coordinate information of the airborne object at distinct times; determining a probability that the airborne object will collide with the one or more sensors based on the 3-D coordinate information; determining a driving action of a vehicle based on the determined probability; and performing the driving action.

In some embodiments, the detection radius is determined based on a size of the airborne object.

In some embodiments, the instructions further cause the system to perform: estimating a force of collision between the airborne object and the one or more sensors in response to determining the probability; and determining the driving action based on the estimated force of collision.

In some embodiments, the instructions further cause the system to perform: obtaining an expected force of collision from a product of the estimated force of collision and the probability; and determining the driving action based on the expected force of collision.

In some embodiments, the estimating the force of collision comprises: determining a type of the airborne object; inferring a mass of the airborne object based on the determined type of the airborne object; determining an acceleration of the airborne object based on the 3-D coordinate information of the airborne object at distinct times; and estimating the force of collision based on the inferred mass of the airborne object and the determined acceleration of the airborne object.

In some embodiments, the determining the probability that the airborne object will collide with the one or more sensors comprises: determining possible trajectories of the airborne object; obtaining a weighted average of the possible trajectories of the airborne object; and determining a probability that the weighted average overlaps with an estimated trajectory of the vehicle.

In some embodiments, the instructions further cause the system to perform: detecting a second airborne object within the detection radius of a vehicle; and in response to detecting the second airborne object, updating the possible trajectories of the airborne object based on determined or predicted trajectories of the second airborne object.

In some embodiments, the instructions further cause the system to perform: predicting how a vehicle action affects the probability of the collision; and in response to predicting that the vehicle action lowers the probability of the collision, determining the vehicle action as the driving action.

In some embodiments, the determining a driving action comprises not changing a direction of the vehicle in response to the determined probability being below a threshold.

In some embodiments, the determining a driving action comprises a lane change or swerving the vehicle to avoid the airborne object.

Various embodiments of the present disclosure provide a method implemented by a computing system including one or more processors and storage media storing machine-readable instructions, wherein the method is performed using the one or more processors. The method comprises detecting an airborne object within a detection radius of a vehicle; in response to detecting the airborne object, tracking the airborne object to obtain 3-D coordinate information of the airborne object at distinct times; determining a probability that the airborne object will collide with one or more sensors based on the 3-D coordinate information; determining a driving action of a vehicle based on the determined probability; and performing the driving action.

In some embodiments, the method further comprises determining the detection radius based on a size of the airborne object.

In some embodiments, the method further comprises estimating a force of collision between the airborne object and the one or more sensors in response to determining the probability; and determining the driving action based on the estimated force of collision.

In some embodiments, the method further comprises obtaining an expected force of collision from a product of the estimated force of collision and the probability; and determining the driving action based on the expected force of collision.

In some embodiments, the estimating the force of collision comprises: determining a type of the airborne object; inferring a mass of the airborne object based on the determined type of the airborne object; determining an acceleration of the airborne object based on the 3-D coordinate information of the airborne object at distinct times; and estimating the force of collision based on the inferred mass of the airborne object and the determined acceleration of the airborne object.

In some embodiments, the determining the probability that the airborne object will collide with the one or more sensors comprises: determining possible trajectories of the airborne object; obtaining a weighted average of the possible trajectories of the airborne object; and determining a probability that the weighted average overlaps with an estimated trajectory of the vehicle.

In some embodiments, the method further comprises detecting a second airborne object within the detection radius of a vehicle; and in response to detecting the second airborne object, updating the possible trajectories of the airborne object based on determined or predicted trajectories of the second airborne object.

In some embodiments, the method further comprises predicting how a vehicle action affects the probability of the collision; and in response to predicting that the vehicle action lowers the probability of the collision, determining the vehicle action as the driving action.

In some embodiments, the determining a driving action comprises not changing a direction of the vehicle in response to the determined probability being below a threshold.

In some embodiments, the determining a driving action comprises a lane change or swerving the vehicle to avoid the airborne object.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In order for a sensor or a vehicle to be protected from airborne debris, one or more sensors of the vehicle may detect one or more airborne objects within a detection radius. The one or more sensors of the vehicle may further acquire information about positions of the one or more airborne objects, either absolute or relative to the vehicle, at distinct times. Using the data from the one or more sensors, one or more processors of the vehicle may determine a velocity, and/or acceleration of the one or more airborne objects, either absolute or relative to the vehicle. The one or more processors may predict trajectories for each of the one or more airborne objects and determine a probability that each of the one or more airborne objects will collide with the vehicle. The one or more processors may further determine an estimated impact such as a force if a collision occurs. The one or more processors may further determine an expected impact by multiplying the probability by the estimated impact The one or more processors may further determine and perform an action such as a driving action based on the determined probability, estimated impact, and/or the expected impact.

Figure 1:
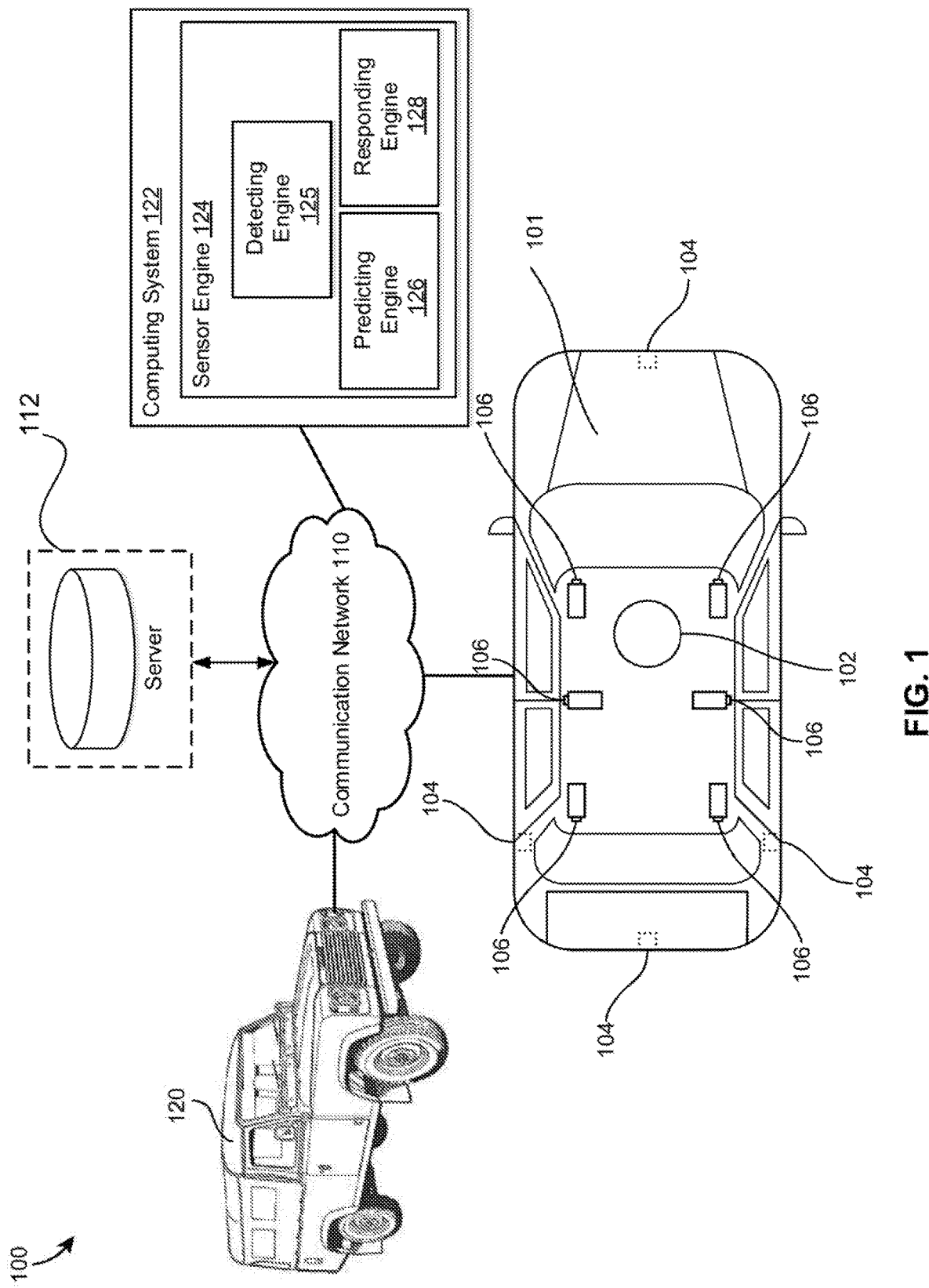
FIG. 1 illustrates an example environment of a system that detects airborne objects within a detection radius, predicts a probability of the airborne objects colliding with a sensor or a vehicle, estimates an impact upon collision, determines an expected impact, and performs an action to prevent the collision based on the probability, the estimated impact, and/or the expected impact, according to an embodiment of the present disclosure.

FIG. 1 illustrates an example environment 100 of a system that detects airborne objects within a detection radius, predicts a probability of the airborne objects colliding with a sensor or a vehicle, estimates an impact upon collision, determines an expected impact, and performs an action to prevent the collision based on the probability, the estimated impact, and/or the expected impact, according to an embodiment of the present disclosure. In FIG. 1, a vehicle such as an autonomous vehicle 101 may include myriad sensors (LiDAR sensors 102, radar sensors 104, cameras 106, GPS, sonar, ultrasonic, IMU (inertial measurement unit), accelerometers, gyroscopes, magnetometers, and FIR (far infrared) sensors) to detect and identify objects in the surrounding. The myriad sensors The sensor data may capture pictorial or image data (e.g., pictures, videos), audio data, audiovisual data, atmospheric data (e.g., temperature, pressure, elevation, and/or the like) captured in either real-time or with a time delay. For example, the LiDAR sensors 102 can generate a three-dimensional map of the environment. The LiDAR sensors 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The vehicle 101 may be connected, via a communication network 110, to at least one computing system 122 that includes one or more processors and memory. The one or more processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, one or more computing systems of the data platform may receive and process search queries to obtain sensor data, process the sensor data, determine a action, and/or perform the action such as a driving action.

In some embodiments, the computing system 122 may include a sensor engine 124 that may control operations of or relating to the sensors or protection of the sensors such as the LiDAR sensors 102, radar systems 104 and cameras 106. The sensor engine 124 may include a detecting engine 125, a predicting engine 126 and a responding engine 128. The sensor engine 124 may be executed by the processor(s) of the computing system 122 to perform various operations including those operations described in reference to the detecting engine 125, the predicting engine 126 and the responding engine 128. In general, the sensor engine 124 may be implemented, in whole or in part, as software that is capable of running on one or more computing devices or systems. In one example, the sensor engine 124 may be implemented as or within a software application running on one or more computing devices (e.g., user or client devices) and/or one or more servers (e.g., network servers or cloud servers, servers 112). In some instances, various aspects of the detecting engine 125, the predicting engine 126 and the responding engine 128 may be implemented in one or more computing systems and/or devices. In some instances, one or more of the detecting engine 125, the predicting engine 126 and the responding engine 128 may be combined or integrated into a single processor, and some or all functions performed by one or more of the detecting engine 125, the predicting engine 126 and the responding engine 128 may not be spatially separated, but instead may be performed by a common processor. The environment 100 may also include one or more servers 112 accessible to the computing system 122. The one or more servers 112 may store sensor data from the vehicle 101, one or more sensors of other vehicles such as another vehicle 120, one or more satellite maps, and/or one or more road sensors such as sensors on traffic lights. In some embodiments, the one or more servers 112 may integrate data from different sensors. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the predicting engine 126 and the responding engine 128 to provide the various features described herein. In some embodiments, the one or more servers 112 may store data that may be accessed by the another vehicle 120. As an example, data from the sensor engine 124 may be stored in the one or more servers 112 and accessed by the another vehicle 120. The another vehicle 120 may also acquire data from the vehicle 101, either directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces.

The detecting engine 125 may be configured to detect when an airborne object is within a threshold radius of detection, or detection radius, of the vehicle 101. In some embodiments, the threshold detection radius may be one mile or 0.5 miles. In some embodiments, the threshold detection radius may be determined based on an estimated size, mass, and/or type of the airborne object. In some examples, the threshold detection radius may be larger for a smaller airborne object, and vice versa, varying inversely with a size of the airborne object. The detecting engine 125 may detect the airborne object based on a contour line, such as a high contrast region. The detecting engine 125 may further be configured to detect a type of the airborne object (for example, an organism, or category of organism such as a bird or insect, rock, paper, dust, or leaf). Algorithms that may be used to detect an airborne object may include faster R-CNN, YOLO, SSD, and/or R-FCN. Once an airborne object is detected, by the detecting engine 125, to be within the threshold detection radius, the detecting engine 125 may track the airborne object and determine 3-D positions of the airborne object relative to the vehicle 101, and/or absolute 3-D positions, at distinct respective times. In some examples, the detecting engine 125 may use direct linear transformation or homography such as inter trajectory homography to track the airborne object.

The predicting engine 126 may use the data of the 3-D positions of the airborne object, acquired by the detecting engine 125, and predict possible trajectories of the airborne object based on movements of the airborne object tracked by the detecting engine 125, and/or based on previous data of movements of objects of a same type as the airborne object. In some embodiments, the predicting engine 126 may predict a velocity, and/or acceleration of the airborne object based on the data of the 3-D positions of the airborne object acquired at various times. In some embodiments, for each predicted trajectory, the predicting engine 126 may determine a probability of that trajectory occurring (for example, how likely the trajectory is likely to occur). In some embodiments, the predicting engine 126 may update the predicted trajectories based on a presence of other objects. In some examples, the predicting engine 126 may determine how other objects may obtain the updated predicted trajectories.

In some embodiments, based on a weighted average or other weighted combination of some or all possible trajectories of the airborne object, the predicting engine 126 may determine a probability that the airborne object will collide with the vehicle 101, and/or that the airborne object will collide with sensors of the vehicle 101 such as the LiDAR sensors 102, the radar sensors 104, and the cameras 106. In some embodiments, the weight may be determined based on a probability or likelihood of that corresponding trajectory occurring. In some embodiments, the predicting engine 126 may determine a probability that the weighted average overlaps with an estimated trajectory of the vehicle 101. In some embodiments, the predicting engine 126 may determine a probability that the weighted average overlaps with an estimated trajectory or path of the vehicle 101 or the sensors of the vehicle. In some embodiments, the predicting engine 126 may determine a probability that each of the possible trajectories overlap with an estimated path or trajectory of the vehicle 101 or the sensors of the vehicle 101, and take a weighted average of each of the probabilities corresponding to each of the possible trajectories. In some embodiments, the predicting engine 126 may estimate a force of collision between the airborne object with the vehicle 101 and/or the sensors, based on an estimated mass of the airborne object and an acceleration of the airborne object. The estimated mass of the airborne object may be obtained from the detecting engine 125, which may detect what type the airborne object is (for example, an organism, or category of organism such as a bird or insect, rock, paper, dust, or leaf) and infer a mass from previously known or stored data that correlates a density or mass of an object with each type of object, such as metadata of previously known objects. In some embodiments, if the predicting engine 126 obtains information about an estimated density and estimated volume of the airborne object, the predicting engine 126 may estimate the mass of the airborne object by taking a product of the estimated volume and the estimated density. In some embodiments, the predicting engine 126 may take a weighted average of estimated forces of collision for each of the possible trajectories of the airborne object, with a predicted or estimated path or trajectory of the vehicle 101. In some embodiments, the predicting engine 126 may further determine an expected force of collision by taking a product of the estimated force of collision and the probability of collision.

In some embodiments, the predicting engine 126 may further determine a probability of the collision, estimate a force of collision, and determine an expected force of collision, if the vehicle 101 takes a driving action such as a lane change, stopping the vehicle 101, or reversing direction of the vehicle 101. For example, the predicting engine 126 may determine how a driving action may affect the probability of the collision, the estimated force of collision, and the expected force of collision, and whether a driving action may lower the probability of the collision, the estimated force of collision, and/or the expected force of collision.

The responding engine 128 may be configured to determine an action in response to the determined probability of the collision, the estimated force of collision, and/or the expected force of collision. In some embodiments, the responding engine 128 may determine to take no action if the determined probability of the collision, the estimated force of collision, and/or the expected force of collision is/are below respective thresholds. For example, the responding engine 128 may determine not to change a direction of the vehicle in response to the determined probability being below a threshold. In some embodiments, the responding engine 128 may determine an action if the determined probability of the collision, the estimated force of collision, and/or the expected force of collision is/are above or equal to respective thresholds. In some embodiments, the responding engine 128 may select an action based on the determined probability of the collision, the estimated force of collision, and/or the expected force of collision. In some examples, the responding engine 128 may select a lane change and/or change a speed of the vehicle 101 (e.g., slow down the vehicle 101) if the determined probability of the collision, the estimated force of collision, and/or the expected force of collision is/are lower than one or more respective thresholds, or within a lower range of thresholds. In some examples, the responding engine 128 may determine to stop the vehicle 101 or reverse the vehicle 101 if the determined probability of the collision, the estimated force of collision, and/or the expected force of collision is/are higher than or equal to one or more respective thresholds, or within a higher range of thresholds. In other words, the responding engine 128 may determine to take more drastic actions in response to a higher determined probability of the collision, estimated force of collision, and/or expected force of collision. In some embodiments, the responding engine 128 may select the action that results in a lowest probability of the collision, estimated force of collision, and/or expected force of collision. In some embodiments, the responding engine 128 may select the action that results in a least inconvenience, or that consumes a least amount of energy, time, or other resource, out of the actions that would result lowering the probability of the collision, the estimated force of collision, and/or the expected force of collision, to below one or more respective threshold values. In some embodiments, the responding engine 128 may determine the driving action based on a detected type of the airborne object. For example, if the detected type of the airborne object is a leaf or insect, the responding engine 128 may not take any action and may not change a direction of the vehicle 101. In another example, if the detected type of the airborne object is an animal, the responding engine 128 may only take action or change a direction of the vehicle 101 if the airborne object is greater than a certain size or predicted mass.

Figure 2A:
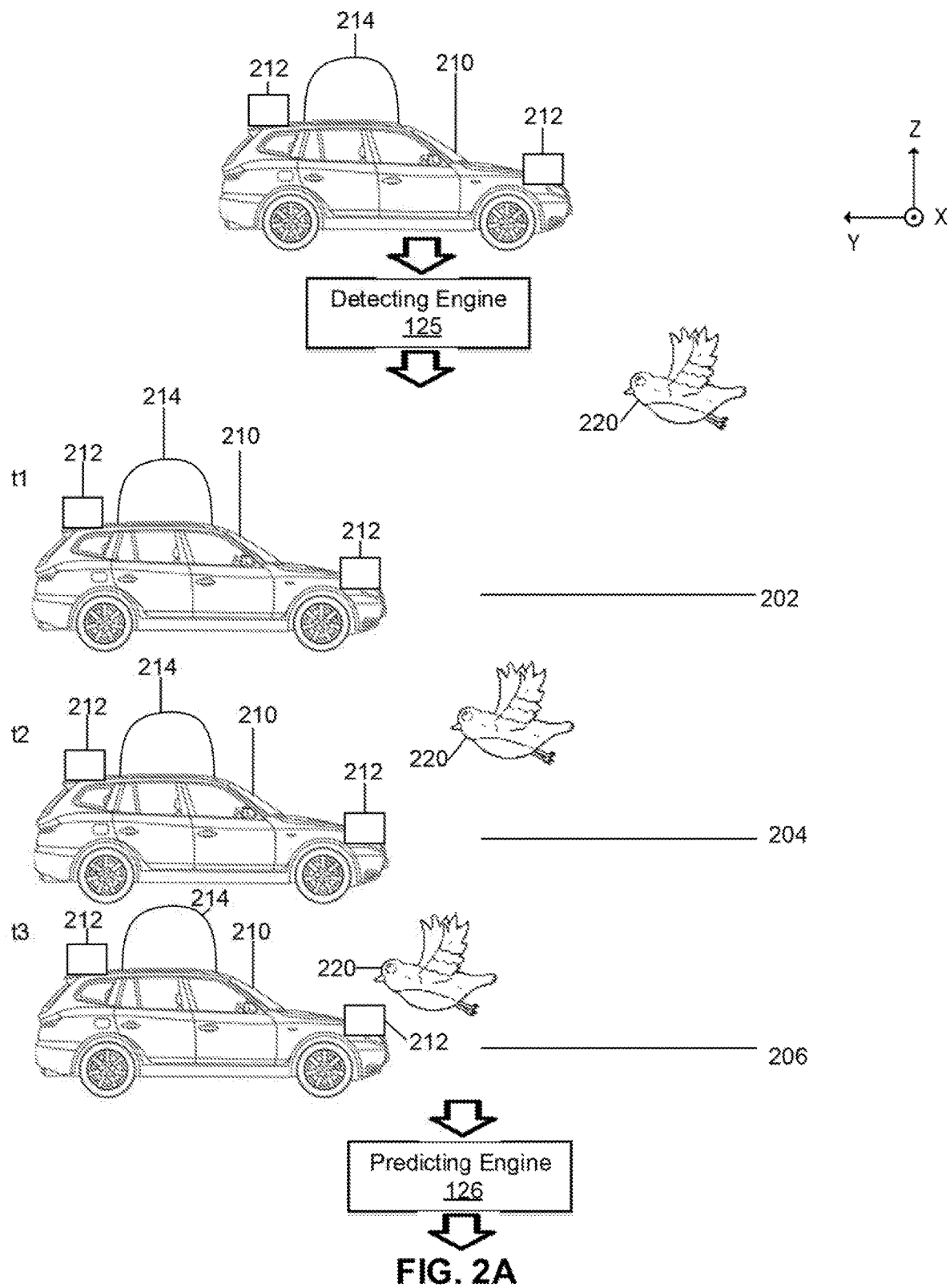
FIGS. 2A-2O illustrate an exemplary implementations of the system, according to an embodiment of the present disclosure.
Figure 2A:
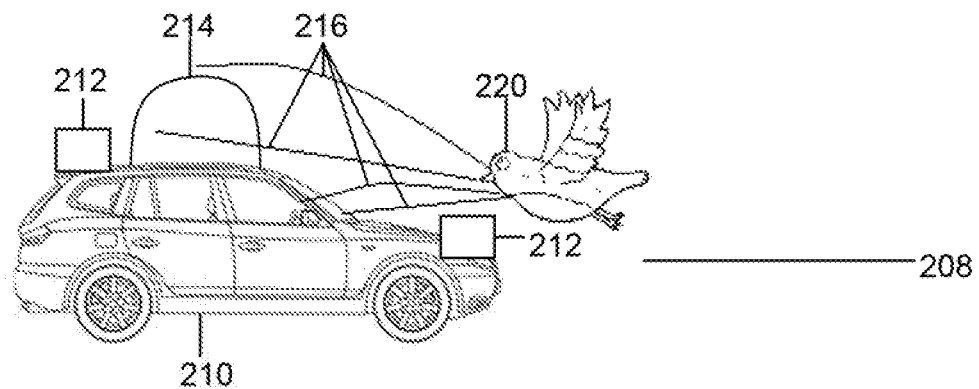

FIGS. 2A-2O illustrate exemplary implementations of the system, according to embodiments of the present disclosure, and showing operations of the detecting engine 125, the predicting engine 126, and the responding engine 128.

In the example of FIG. 2A, a vehicle 210, which may be implemented as vehicle 101, is shown with a LiDAR 214, which may further comprise an enclosure coupled to a roof or a top of the vehicle 210. As discussed, LiDARs such as LiDAR 214 can be configured to generate three dimensional maps of an environment and detect objects in the environment. The vehicle 210 may further comprise sensors 212, which may, for example, be cameras or radar sensors. In some embodiments, the sensors 212 may comprise radar sensors at a front-side and a back-side that can be configured for adaptive cruise control and/or accident avoidance. For example, the front-side radar system can be used by the vehicle 210 to maintain a healthy distance from a vehicle ahead of a vehicle ahead. In another example, if the vehicle ahead experiences a sudden reduction in speed, the vehicle 210 can detect this sudden change in motion and adjust its vehicle speed accordingly. In some embodiments, the radar sensors can be configured for blind-spot detection.

The detecting engine 125 may detect, at a time t1 and corresponding to a stage (e.g., instance in time) 202, an airborne object 220 that is within a detection radius. The detecting engine 125 may further track the airborne object 220 at times t2 and t3 to determine a 3-D position of the airborne object 220 at each time t1, t2, and t3, relative to the vehicle 210, and/or in absolute coordinates.

The predicting engine 126 may, based on the data of the 3-D position of the airborne object 220 at each time t1, t2, and t3, estimate trajectories 216 of the airborne object 216, at a stage 208, based on movements of the airborne object 220 tracked by the detecting engine 125, and/or based on previous data of movements of objects of a same type as the airborne object 220. In FIG. 2B, the predicting engine 126 may, at a stage 211, determine a probability that the airborne object 220 will collide with the vehicle 210, and/or that the airborne object 220 will collide with sensors of the vehicle 210 such as the LiDAR sensor 214, and the sensors 212. In some embodiments, the predicting engine 126 may estimate a force of collision between the airborne object 220 and the vehicle 210, based on an estimated mass of the airborne object 220 and an acceleration of the airborne object 220. In some embodiments, the predicting engine 126 may further determine an expected force of collision by taking a product of the estimated force of collision and the probability of collision.

In FIG. 2C, the predicting engine 126 may further determine whether one or more actions of the vehicle 210 may decrease a probability of the collision, an estimated force of collision, and/or an expected force of collision, in stage 213. If the vehicle 210 changes its relative orientation 217 as a result of one or more actions such as a driving action, the predicting engine 126 may update a determined probability of the collision, an estimated force of collision, and/or an expected force of collision, to determine, for example, if one or more of the aforementioned parameters is lower as a result of the one or more actions.

Figure 2D:
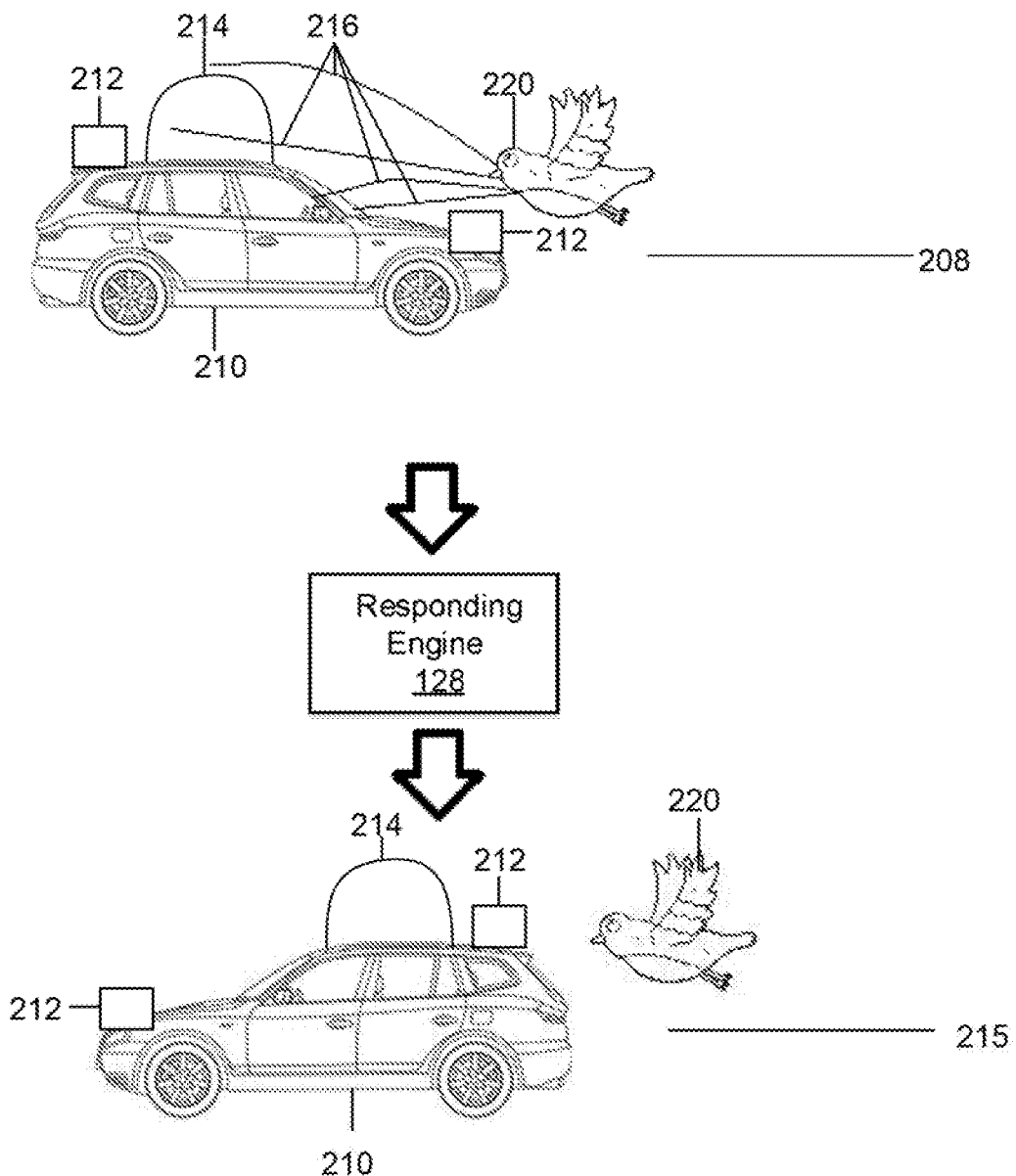
Figure 2E:
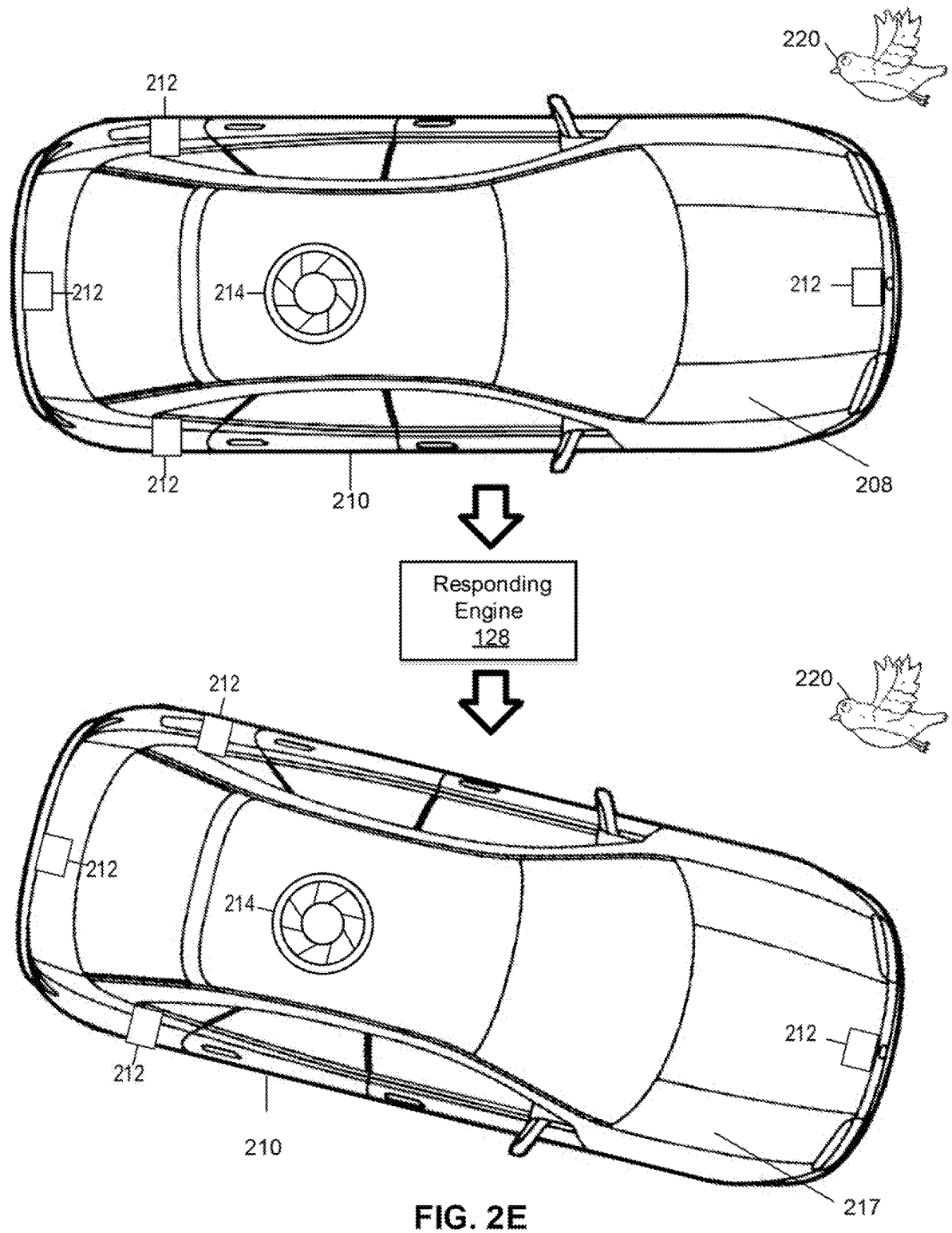

In FIG. 2D, the responding engine 128 may determine one or more actions, such as a driving action, to take in response to the airborne object 220. In some embodiments, as shown in FIG. 2D, and stage 215, the responding engine 128 may determine to reverse the vehicle 210 as a result of the airborne object 220. In FIG. 2E, the responding engine 128 may determine to swerve the vehicle 210 or change lanes, in stage 217, in an effort to avoid the airborne object 220.

Figure 2F:
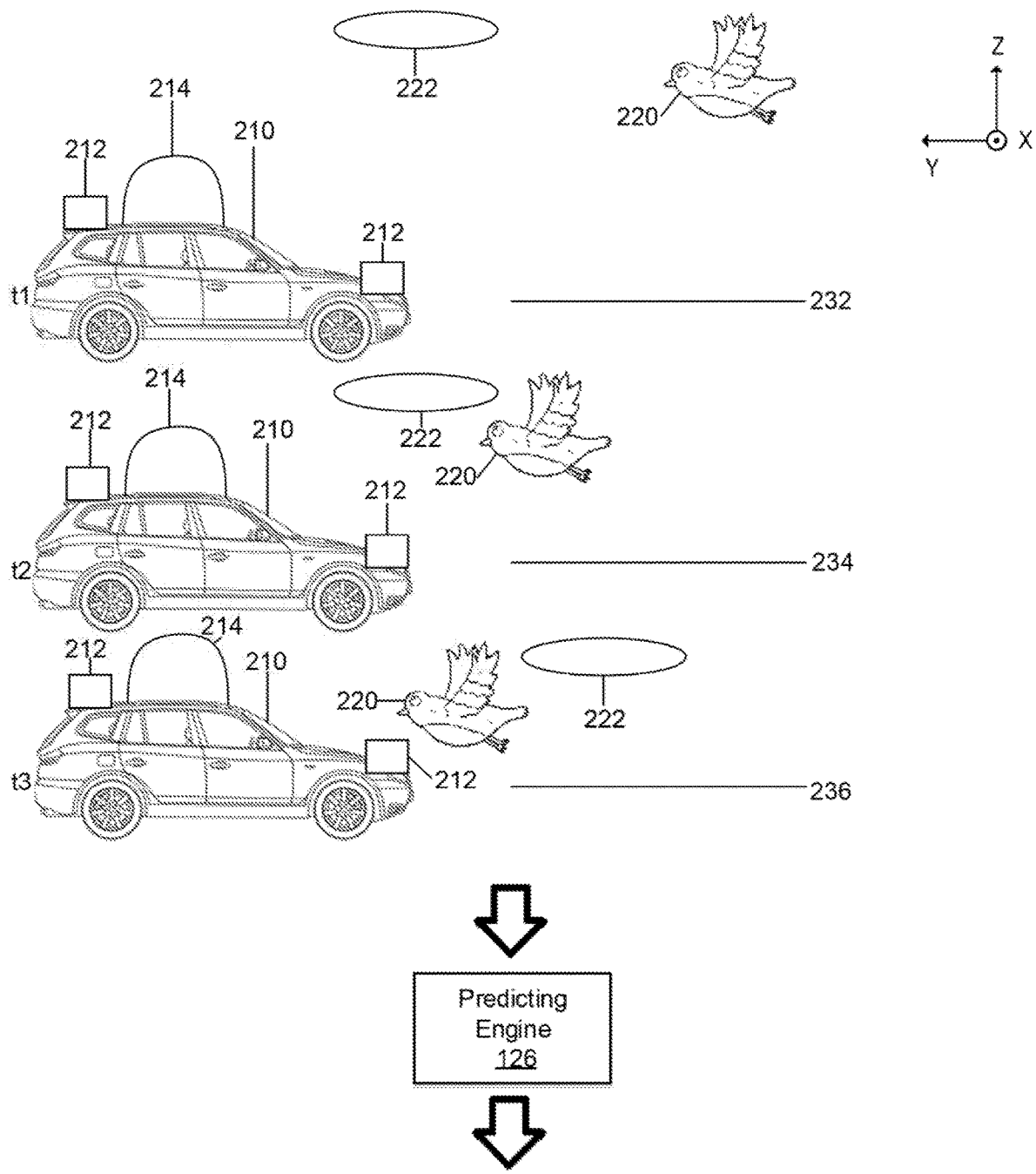
Figure 2F:
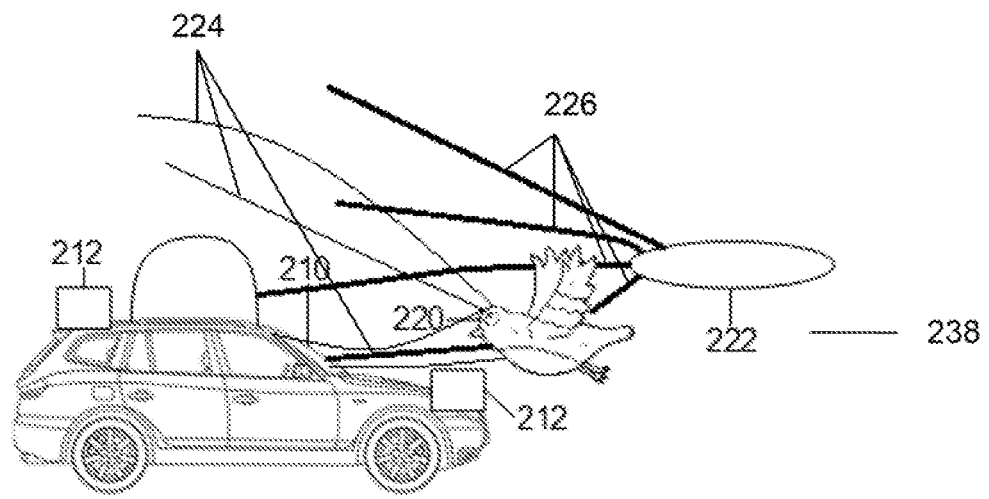

In FIG. 2F, the detecting engine 125 may detect multiple airborne objects, including the airborne object 220 and a second airborne object 222. The detecting engine 125 may track a 3-D position of both the airborne object 220 and the second airborne object 222 at times t1, t2, and t3, corresponding to stages 232, 234, and 236. The predicting engine 226 may, at stage 238, estimate trajectories 224 of the airborne object 220 and second trajectories 226 of the second airborne object 222. The predicting engine 226 may estimate trajectories 224 based on an influence or effect from the second airborne object 222 (for example, how a predicted movement of the second airborne object 222 may affect the trajectories 224, such as the airborne object 220 swerving to avoid the second airborne object 222). Similarly, the predicting engine may estimate the second trajectories 226 based on an influence or effect from the airborne object 220.

In FIG. 2G, the predicting engine 126 may, at a stage 241, determine a probability that the airborne object 220 and/or the second airborne object 222 will collide with the vehicle 210, and/or that the airborne object 220 and/or the second airborne object 222 will collide with sensors of the vehicle 210 such as the LiDAR sensor 214, and the sensors 212. In some embodiments, the predicting engine 126 may estimate a force of collision between the airborne object 220 and/or the second airborne object 222 with the vehicle 210, based on an estimated mass of the airborne object 220 and/or the second airborne object 222 and an acceleration of the airborne object 220 and/or the second airborne object 222. In some embodiments, the predicting engine 126 may further determine an expected force of collision by taking a product of the estimated force of collision and the probability of collision.

Tables 1-3 show exemplary embodiments of an operation of the responding engine 128. In some embodiments, the responding engine 128 may determine an action such as a driving action of the vehicle 210 based on a probability of a collision with the vehicle 210 or the LiDAR sensor 214, and/or the sensors 212, with the airborne object 220 and/or the second airborne object 222. In some examples, as shown in Table 1, if the probability of a collision from the airborne object 220 and/or the second airborne object 222 is 0-25%, the responding engine 128 determines that no driving action is to be taken. If the probability of a collision from the airborne object 220 and/or the second airborne object 222 is 25.01-50%, the responding engine 128 determines that the driving action to be taken is swerving or changing lanes to avoid the airborne object 220 and/or the second airborne object 222. If the probability of a collision from the airborne object 220 and/or the second airborne object 222 is 50.01-75%, the responding engine 128 determines that the driving action to be taken is stopping the vehicle 210. If the probability of a collision from the airborne object 220 and/or the second airborne object 222 is 75.01-100%, the responding engine 128 determines that the driving action to be taken is reversing or changing a direction or route the vehicle 210.

In some embodiments, the responding engine 128 may determine an action such as a driving action of the vehicle 210 based on an estimated force of a collision from the airborne object 220 and/or the second airborne object 222 with the vehicle 210 or the LiDAR sensor 214, and/or the sensors 212. In some examples, as shown in Table 2, if the estimated force of a collision from the airborne object 220 and/or the second airborne object 222 is 0-10 Newtons, the responding engine 128 determines that no driving action is to be taken. If the estimated force of a collision from the airborne object 220 and/or the second airborne object 222 is 10-20 Newtons, the responding engine 128 determines that the driving action to be taken is swerving or changing lanes to avoid the airborne object 220 and/or the second airborne object 222. If the estimated force of a collision from the airborne object 220 and/or the second airborne object 222 is 20-30 Newtons, the responding engine 128 determines that the driving action to be taken is stopping the vehicle 210. If the estimated force of a collision from the airborne object 220 and/or the second airborne object 222 is over 30

Newtons, the responding engine 128 determines that the driving action to be taken is reversing or changing a direction or route the vehicle 210.

In some embodiments, the responding engine 128 may determine an action such as a driving action of the vehicle 210 based on an expected force of a collision from the airborne object 220 and/or the second airborne object 222 with the vehicle 210 or the LiDAR sensor 214, and/or the sensors 212. In some examples, as shown in Table 3, if the expected force of a collision from the airborne object 220 and/or the second airborne object 222 is 0-5 Newtons, the responding engine 128 determines that no driving action is to be taken. If the estimated force of a collision from the airborne object 220 and/or the second airborne object 222 is 5-10 Newtons, the responding engine 128 determines that the driving action to be taken is swerving or changing lanes to avoid the airborne object 220 and/or the second airborne object 222. If the estimated force of a collision from the airborne object 220 and/or the second airborne object 222 is 10-20 Newtons, the responding engine 128 determines that the driving action to be taken is stopping the vehicle 210. If the estimated force of a collision from the airborne object 220 and/or the second airborne object 222 is over 20 Newtons, the responding engine 128 determines that the driving action to be taken is reversing or changing a direction or route the vehicle 210.

The examples shown in Tables 1-3 are non-limiting and are merely provided to explain a concept of the vehicle 210 taking different actions depending on a probability of collision, estimated force, and/or expected force, and which range or ranges the probability of collision, estimated force, and/or expected force falls in. In some embodiments, depending on the probability of collision from the airborne object 220 and/or the second airborne object 222, the responding engine 128 may further determine a driving action based on an estimated force of collision. For example, if the probability of collision from the airborne object 220 and/or the second airborne object 222 is 0-25%, the responding engine 128 may not take any driving action if an estimated force of collision is between 0-10 Newtons. If the probability of collision from the airborne object 220 and/or the second airborne object 222 is 25.01-50%, the responding engine 128 may not take any driving action if an estimated force of collision is between 0-5 Newtons.

TABLE 1

| Probability of collision with object | Driving Action Taken |
| --- | --- |
| 0-25% | None |
| 25.01-50% | Swerving or changing lanes |
| 50.01-75% | Stopping or changing speed of the vehicle |
| 75.01-100% | Reversing or changing a direction or route of the vehicle |

TABLE 2

| Estimated force of collision | Driving Action Taken |
| --- | --- |
| 0-10 Newtons | None |
| 10-20 Newtons | Swerving or changing lanes |
| 20-30 Newtons | Stopping or changing speed of the vehicle |
| Over 30 Newtons | Reversing or changing a direction or route of the vehicle |

TABLE 3

| Expected force of collision | Driving Action Taken |
| --- | --- |
| 0-5 Newtons | None |
| 5-10 Newtons | Swerving or changing lanes |
| 10-20 Newtons | Stopping or changing speed of the vehicle |
| Over 20 Newtons | Reversing or changing a direction or route of the vehicle |

Figure 2H:
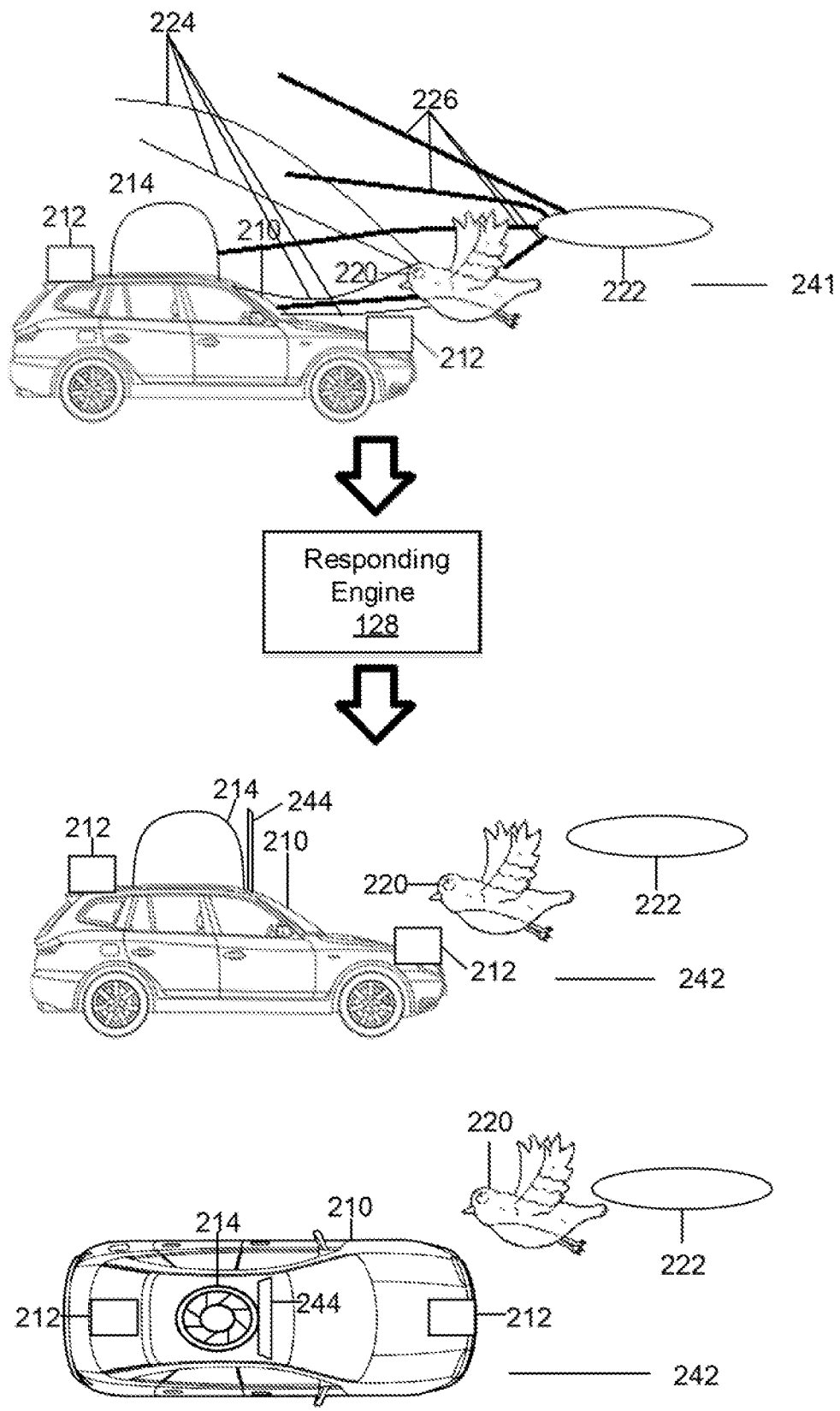
Figure 2I:
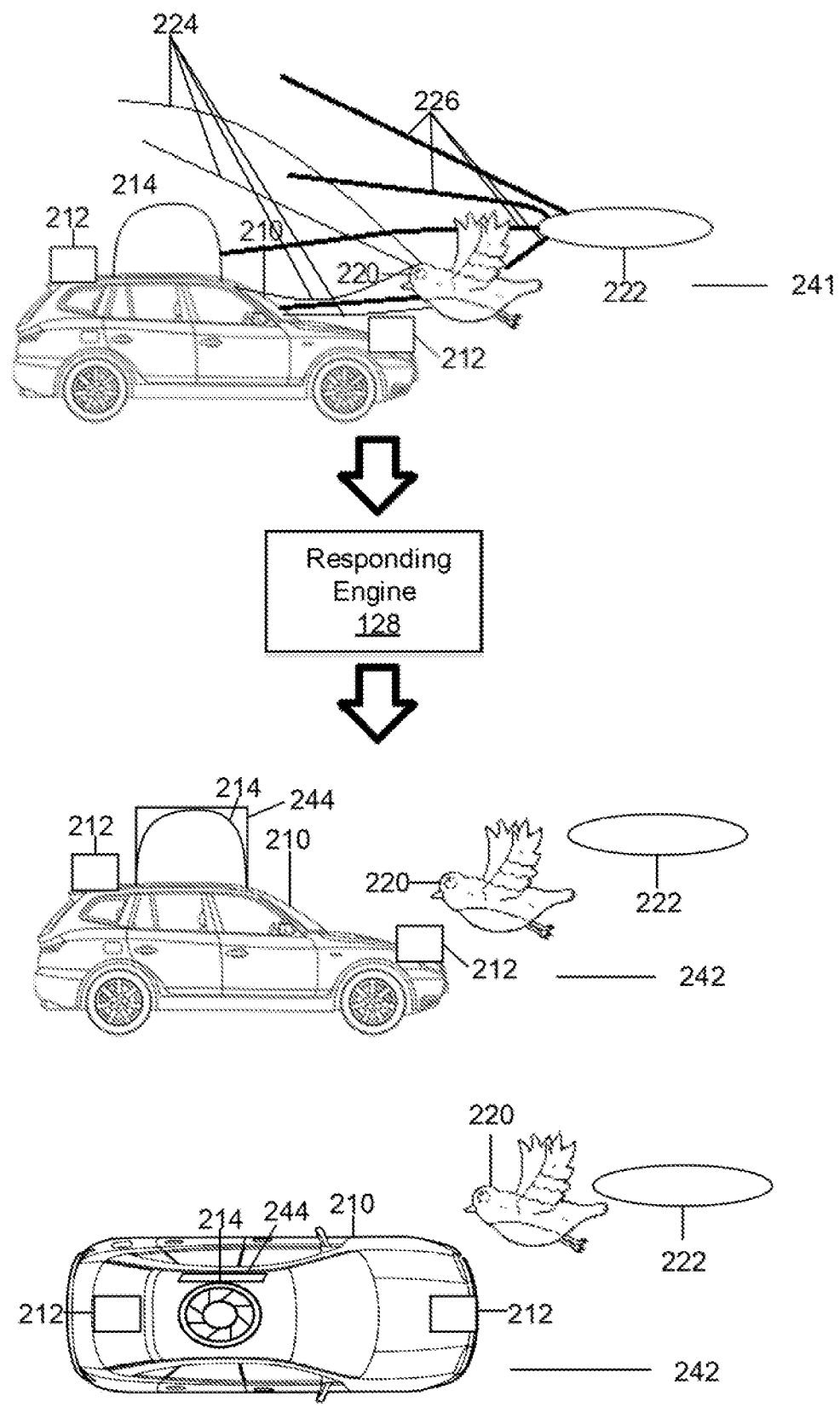
Figure 2J:
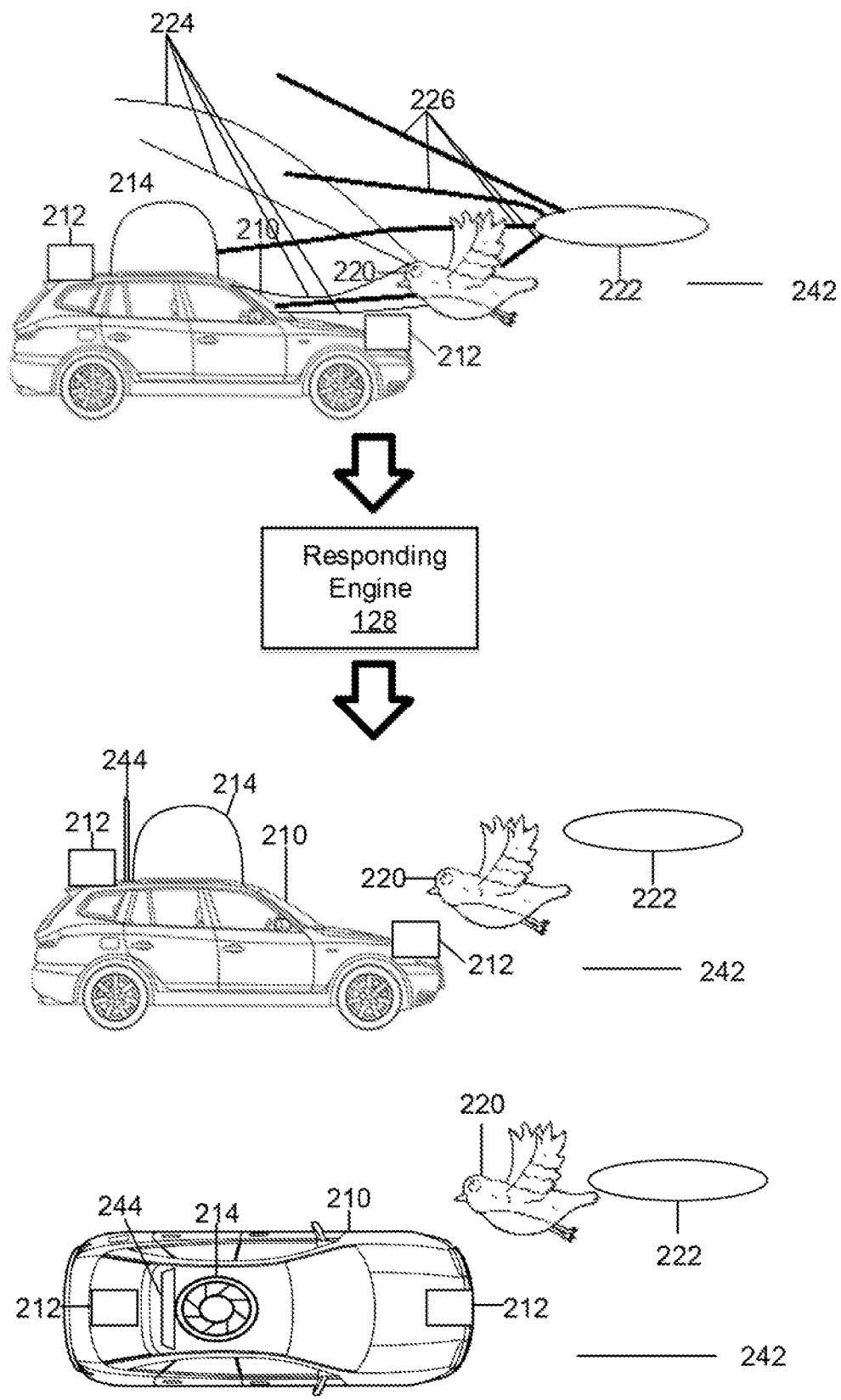
Figure 2K:
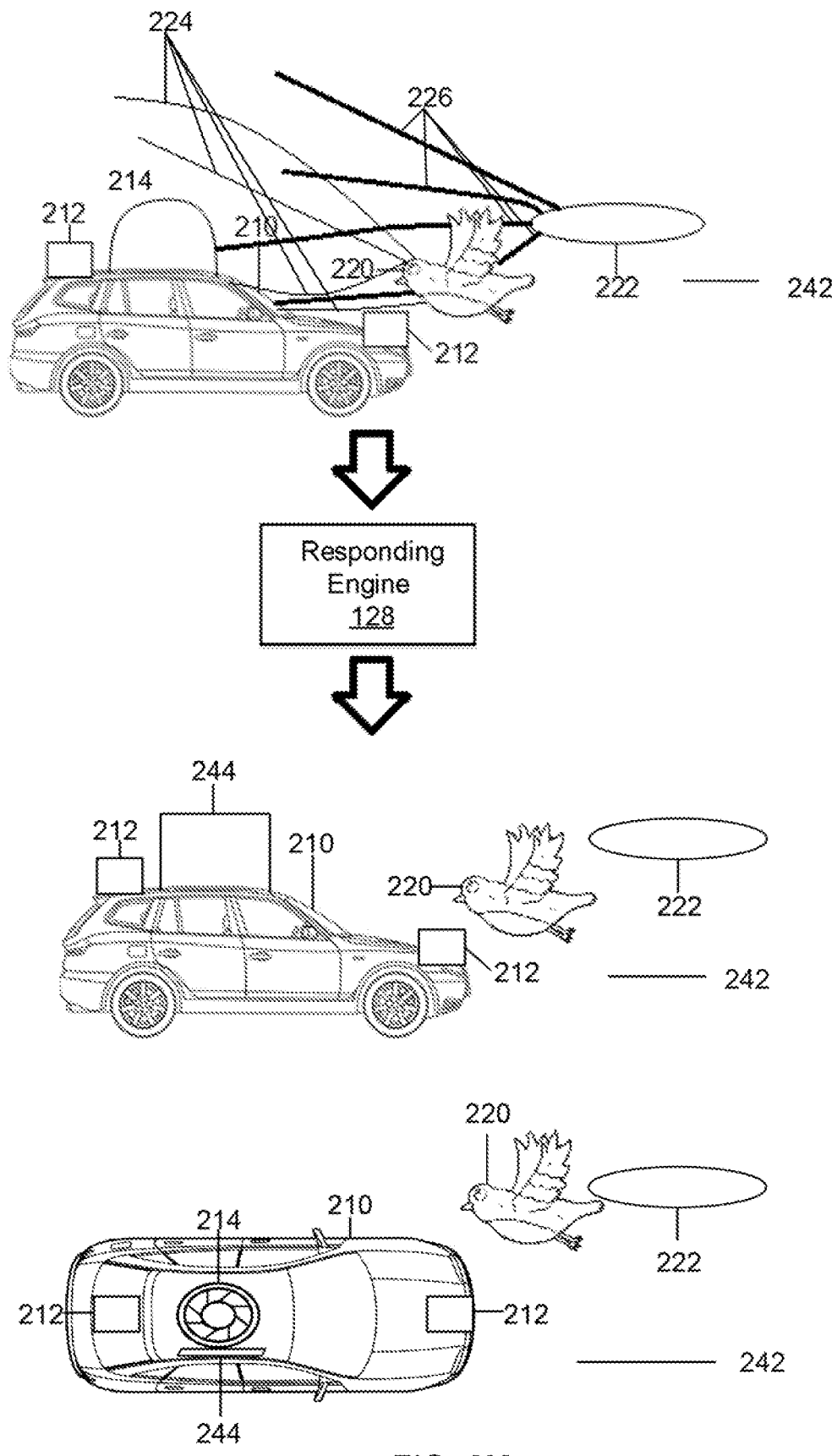
Figure 2L:
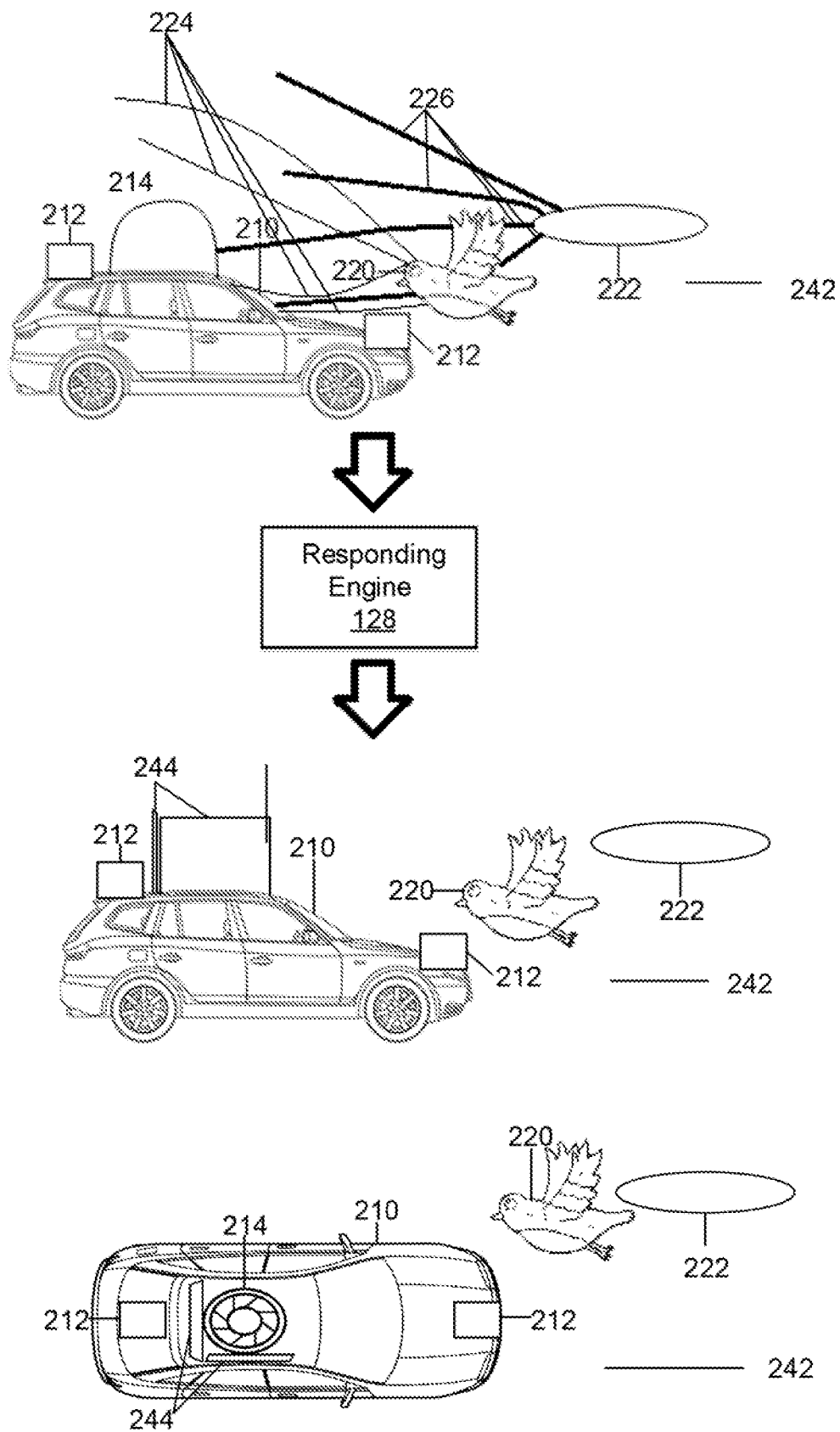

In some embodiments, as shown in FIG. 2H, the responding engine 128 may determine to perform an action of actuating a shield 244 over any of the LiDAR sensor 214, and/or the sensors 212, or any other sensors with which a collision is predicted to occur (e.g., with a probability greater than a threshold collision probability), in a stage 242. The shield may be positioned adjacent to, or directly adjacent to the LiDAR sensor 214, the sensors 212, and/or any other sensors with which a collision is predicted to occur. The responding engine 128 may actuate the shield 244 if a triggering condition occurs, for example, based on any one or any combination of the probability of the collision, the estimated force of the collision, or the expected force of the collision. In some embodiments, the responding engine 128 may actuate the shield 244 if the probability of the collision is above a threshold, and not actuate the shield 244 if the probability of the collision is below or equal to a threshold. In some embodiments, the responding engine 128 may actuate the shield 244 if the estimated force of the collision is above a threshold, and not actuate the shield 244 if the estimated force of the collision is below or equal to a threshold. In some embodiments, the responding engine 128 may actuate the shield 244 if the expected force of the collision is above a threshold, and not actuate the shield 244 if the expected force of the collision is below or equal to a threshold. In some embodiments, the shield 244 may comprise portions (for example, four portions, each of the four portions comprising a plate of different orientation (e.g., perpendicular to one another) to block one or both of the airborne object 220 or the second airborne object 222). One of the four portions may be positioned at a front side closer to a front bumper of the vehicle 210; another of the four portions may be positioned at a back side closer to a back bumper of the vehicle 210; another of the four portions may be positioned at a right side closer to a passenger side of the vehicle 210; another of the four portions may be positioned at a left side closer to a driver side of the vehicle 210. In some embodiments, only one or some of the portions of the shield 244 may be activated or actuated by the responding engine 128 based on a determination or prediction, by the predicting engine 126, of where the airborne object 220 and/or the second airborne object 222 is most likely to collide with a sensor (e.g., the LiDAR sensor 214, the sensors 212, or other sensors), where a highest estimated force of impact is likely to occur, and/or where a highest expected force of impact is likely to occur. In FIG. 2H, the shield 244 is shown to be actuated at the front side without being actuated at other sides. In FIG. 2I, the shield 244 is shown to be actuated at the left side without being actuated at other sides. In FIG. 2J, the shield 244 is shown to be actuated at the back side without being actuated at other sides. In FIG. 2K, the shield 244 is shown to be actuated at the right side without being actuated at other sides. In FIG. 2L, the shield 244 is shown to be actuated at the right side and the back side without being actuated at other sides. In some embodiments, the shield 244 may comprise materials such as a plastic, metal, fiberglass, nanomaterial, acrylic glass (e.g., Cylux, Plexiglas, Acrylite, Lucite, Perspex, etc.), strengthened glass (e.g., Coring® Gorilla® glass), laminated safety glass held in place by layers of polyvinyl butyral (PVB), ethylene-vinyl acetate (EVA), nanomaterials, or other suitable material. In some embodiments, the shield 244 may have smooth and/or rounded edges to reduce turbulent flow.

Figure 2M:
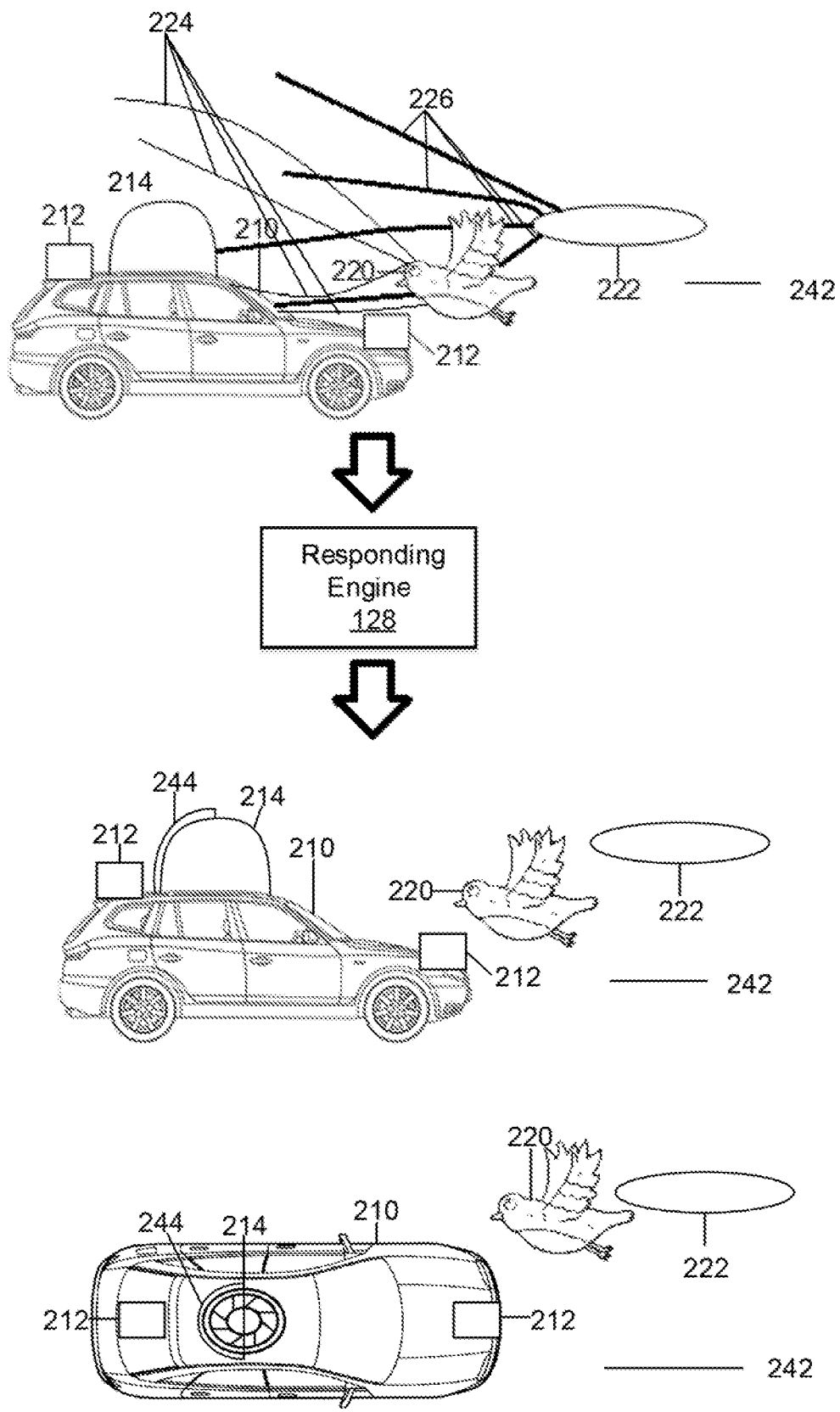
Figure 2N:
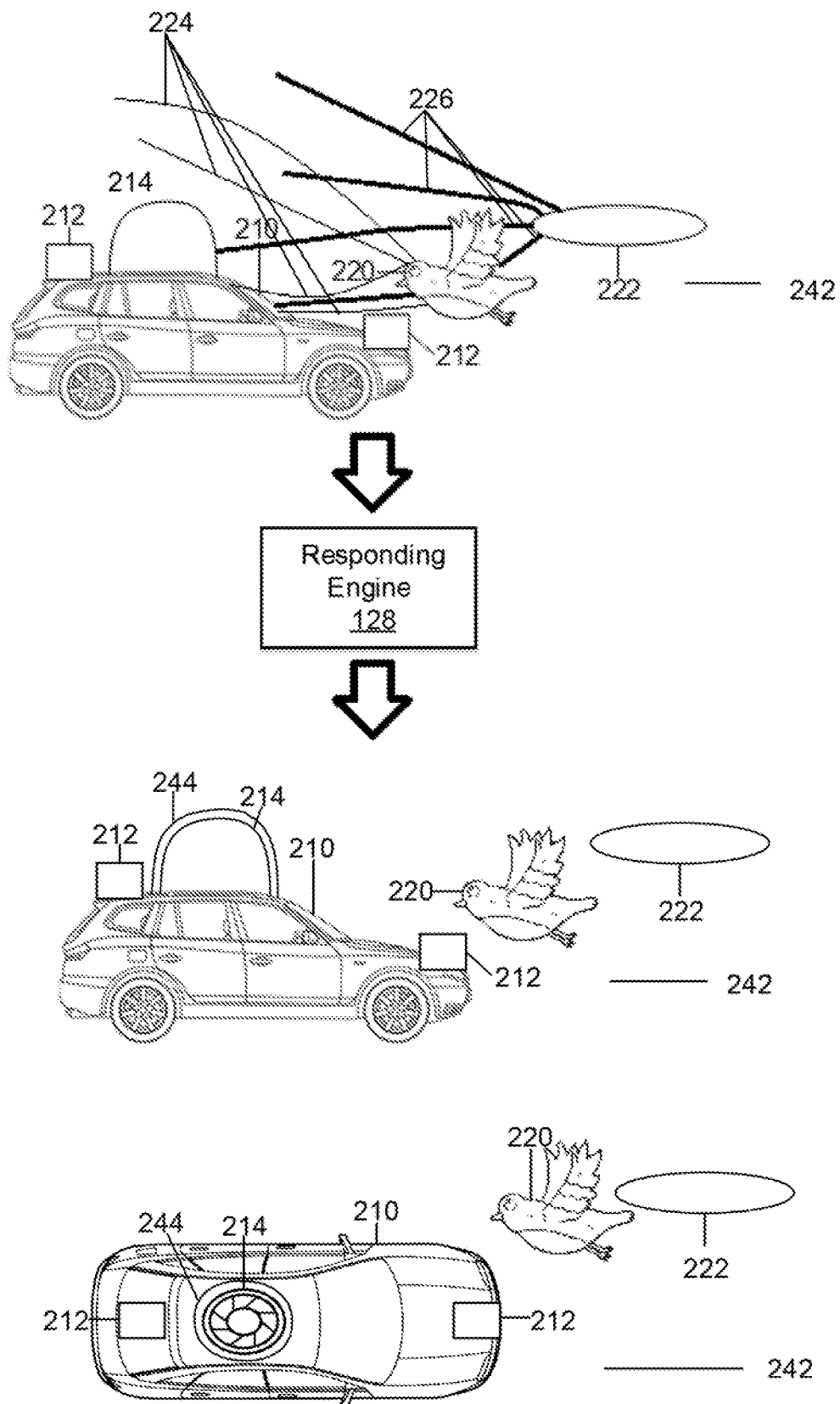
Figure 20:
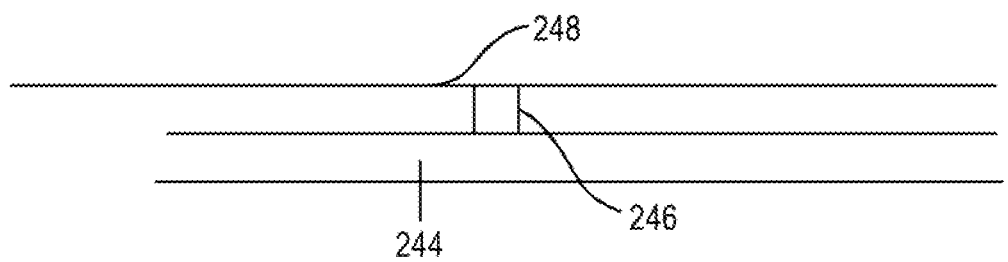

In some embodiments, as shown in FIGS. 2M-2N, the shield 244 may comprise an arc or spherical shape. As shown in FIG. 2M, the shield 244 may, when actuated by the responding engine 128, cover a half of a sensor (e.g., the LiDAR sensor 214). The shield 244 may be positioned on top of or directly over a sensor when actuated. In some embodiments, the responding engine 128 may determine which half of a sensor to cover based on a determination or prediction, by the predicting engine 126, of where the airborne object 220 and/or the second airborne object 222 is most likely to collide with a sensor (e.g., the LiDAR sensor 214, the sensors 212, or other sensors), where a highest estimated force of impact is likely to occur, and/or where a highest expected force of impact is likely to occur. In some embodiments, the responding engine 128 may determine how much of a portion of the sensor to be covered by the shield 244 (e.g., 25%, 50%, 75%, 100%), for example, based on a predicted extent of collision or how many airborne objects (e.g., the airborne object 220, the second airborne object 222, other airborne objects not shown) are likely to collide with the vehicle 210 or sensors of the vehicle 210 with a probability of greater than a threshold. As shown in FIG. 2N, in some embodiments, the shield 244 may, when actuated by the responding engine 128, cover an entire sensor (e.g., the LiDAR sensor 214).

In some embodiments, the shield 244 may be positioned in a groove or rail 248 and be actuated by an electromechanical setup such as a shutter mechanism. In some embodiments, the shield 244 may be actuated by a piezo motor 246, as shown in FIG. 2O, connected to the shield 244. The piezo motor 246 may comprise an inertia motor. In response to the triggering condition occurring, the responding engine 128 may send a signal to the piezo motor 246 to produce a linear or rotary motion to actuate the shield 244.

Figure 3:
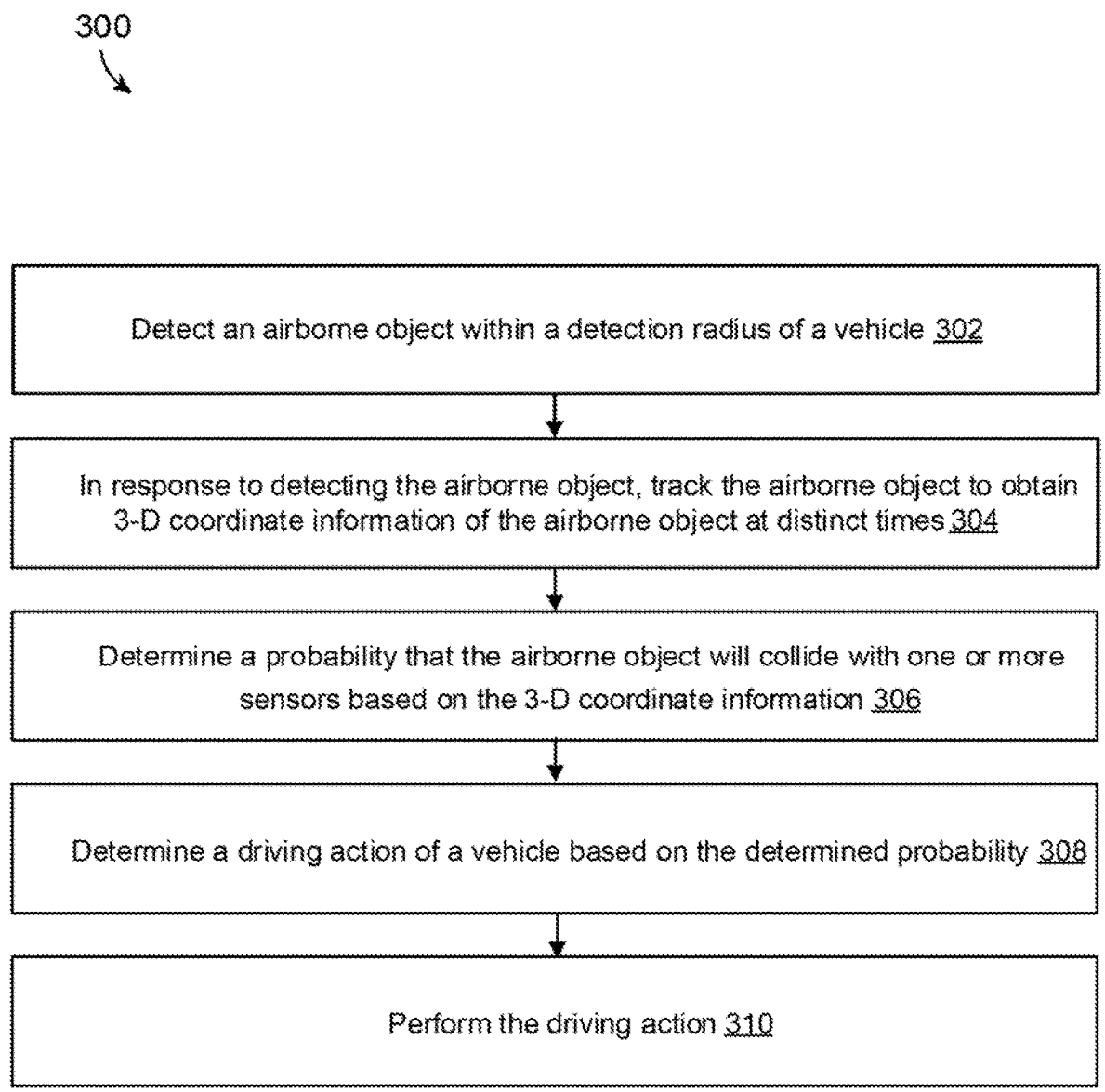
FIG. 3 illustrates a flowchart of an example of a method according to some embodiments of the present disclosure.

FIG. 3 illustrates a flowchart of a method according to some embodiments. In this and other flowcharts, the flowchart 300 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 3.

In step 302, one or more processors may detect an airborne object within a detection radius of a vehicle. In step 304, in response to detecting the airborne object, the one or more processors may the airborne object to obtain 3-D coordinate information of the airborne object at distinct times. In step 306, the one or more processors may determine a probability that the airborne object will collide with one or more sensors based on the 3-D coordinate information. In step 308, the one or more processors may determine a driving action of a vehicle based on the determined probability. In step 310, the one or more processors may perform the driving action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
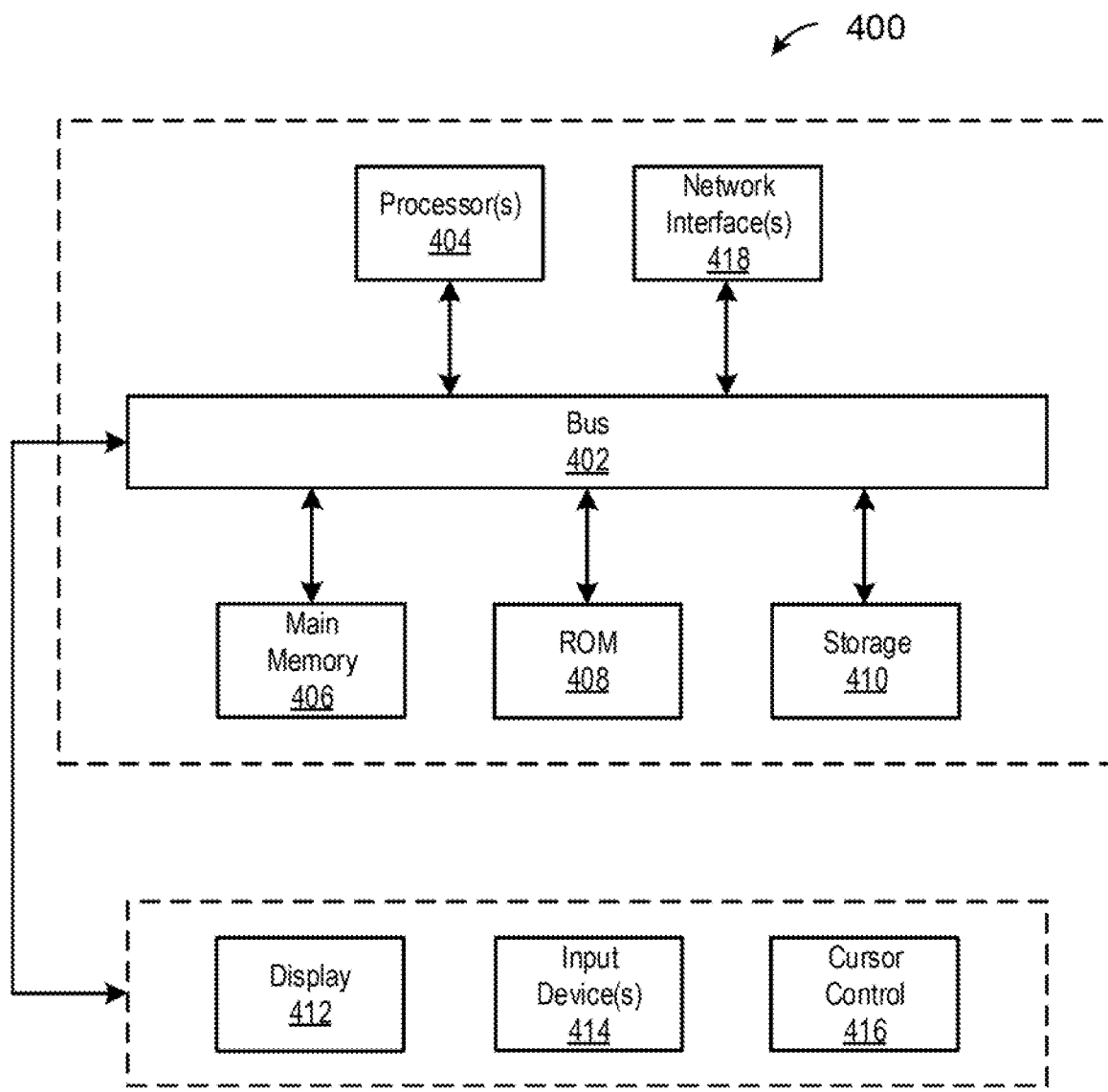
FIG. 4 is a diagram of an example computer system for implementing the features disclosed herein.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system comprising:
   one or more sensors;
   one or more processors; and
   a memory storing instructions that, when executed by the one or more processors, cause the system to perform:
      detecting an airborne object within a detection radius of a vehicle;
      in response to detecting the airborne object, tracking the airborne object to obtain 3-D coordinate information of the airborne object at distinct times;
      determining a probability that the airborne object will collide with the one or more sensors based on the 3-D coordinate information;
      determining a driving action of a vehicle based on the determined probability, the determining the driving action comprising:
         if the probability is less than a first threshold, determining the driving action to be maintaining a same navigation route;
         if the probability is between the first threshold and a second threshold higher than the first threshold, determining the driving action to be swerving or changing lanes to move away from a predicted position of the airborne object;
         if the probability is between the second threshold and a third threshold higher than the second threshold, determining the driving action to be stopping the vehicle; and
         if the probability is between the third threshold and a fourth threshold higher than the third threshold, determining the driving action to be changing the navigation route; and
      A performing the driving action.

2. The system of claim 1, wherein the detection radius is determined based on a size of the airborne object.

3. The system of claim 1, wherein the instructions further cause the system to perform:
   estimating a force of collision between the airborne object and the one or more sensors in response to determining the probability; and
   determining the driving action based on the estimated force of collision.

4. The system of claim 3, wherein the instructions further cause the system to perform:
   obtaining an expected force of collision from a product of the estimated force of collision and the probability; and determining the driving action based on the expected force of collision.

5. The system of claim 3, wherein the estimating the force of collision comprises:
   determining a type of the airborne object;
   inferring a mass of the airborne object based on the determined type of the airborne object;
   determining an acceleration of the airborne object based on the 3-D coordinate information of the airborne object at distinct times; and
   estimating the force of collision based on the inferred mass of the airborne object and the determined acceleration of the airborne object.

6. The system of claim 1, wherein the determining the probability that the airborne object will collide with the one or more sensors comprises:
   determining possible trajectories of the airborne object;
   obtaining a weighted average of the possible trajectories of the airborne object; and
   determining a probability that the weighted average overlaps with an estimated trajectory of the vehicle.

7. The system of claim 6, wherein the instructions further cause the system to perform:
   detecting a second airborne object within the detection radius of a vehicle; and
   in response to detecting the second airborne object, updating the possible trajectories of the airborne object based on determined or predicted trajectories of the second airborne object.

8. The system of claim 1, wherein the instructions further cause the system to perform:
   predicting how a vehicle action affects the probability of the collision; and
   in response to predicting that the vehicle action lowers the probability of the collision, determining the vehicle action as the driving action.

9. The system of claim 1, wherein the instructions further cause the system to perform:
   determining whether to actuate a shield over one of the one or more sensors based on the probability and an estimated force of collision; and
   in response to determining to actuate the shield, actuating the shield.

10. The system of claim 9, further comprising a piezo motor configured to actuate the shield, wherein the instructions further cause the system to perform:
    in response to determining to actuate the shield, determining a location at which the airborne object is most likely to collide with a sensor of the one or more sensors; and
    actuating a portion of the shield based on the predicted location.

11. The system of claim 9, further comprising a piezo motor configured to actuate the shield, and wherein the instructions further cause the system to perform:
    in response to determining to actuate the shield, determining a location at which the airborne object will collide with a sensor of the one or more sensors with a highest estimated force; and
    actuating a portion of the shield based on the predicted location.

12. A method implemented by a computing system including one or more processors and storage media storing machine-readable instructions, wherein the method is performed using the one or more processors, the method comprising:
    detecting an airborne object within a detection radius of a vehicle;
    in response to detecting the airborne object, tracking the airborne object to obtain 3-D coordinate information of the airborne object at distinct times;
    determining a probability that the airborne object will collide with one or more sensors based on the 3-D coordinate information;
    determining a driving action of the vehicle based on the determined probability, the determining the driving action comprising:
       if the probability is less than a first threshold, determining the driving action to be maintaining a same navigation route;
       if the probability is between the first threshold and a second threshold higher than the first threshold, determining the driving action to be swerving or changing lanes to move away from a predicted position of the airborne object;
       if the probability is between the second threshold and a third threshold higher than the second threshold, determining the driving action to be stopping the vehicle; and
       if the probability is between the third threshold and a fourth threshold higher than the third threshold, determining the driving action to be changing the navigation route; and
    performing the driving action.

13. The method of claim 12, further comprising determining the detection radius based on a size of the airborne object.

14. The method of claim 12, further comprising:
    estimating a force of collision between the airborne object and the one or more sensors in response to determining the probability; and
    determining the driving action based on the estimated force of collision.

15. The method of claim 1, further comprising:
    obtaining an expected force of collision from a product of the estimated force of collision and the probability; and
    determining the driving action based on the expected force of collision.

16. The method of claim 12, wherein the estimating the force of collision comprises:
    determining a type of the airborne object;
    inferring a mass of the airborne object based on the determined type of the airborne object;
    determining an acceleration of the airborne object based on the 3-D coordinate information of the airborne object at distinct times; and
    estimating the force of collision based on the inferred mass of the airborne object and the determined acceleration of the airborne object.

17. The method of claim 12, wherein the determining the probability that the airborne object will collide with the one or more sensors comprises:
    determining possible trajectories of the airborne object;
    obtaining a weighted average of the possible trajectories of the airborne object; and
    determining a probability that the weighted average overlaps with an estimated trajectory of the vehicle.

18. The method of claim 17, further comprising:
    detecting a second airborne object within the detection radius of a vehicle; and in response to detecting the second airborne object, updating the possible trajectories of the airborne object based on determined or predicted trajectories of the second airborne object.

19. The method of claim 12, further comprising:
predicting how a vehicle action affects the probability of the collision; and
in response to predicting that the vehicle action lowers the probability of the collision, determining the vehicle action as the driving action.

20. A non-transitory computer-readable storage medium including instructions that, when executed by at least one processor of a computing system, cause the computing system to perform a method comprising:
  detecting an airborne object within a detection radius of a vehicle;
  in response to detecting the airborne object, tracking the airborne object to obtain 3-D coordinate information of the airborne object at distinct times;
  determining a probability that the airborne object will collide with one or more sensors based on the 3-D coordinate information;
  determining a driving action of the vehicle based on the determined probability, the determining the driving action comprising:
    if the probability is less than a first threshold, determining the driving action to be maintaining a same navigation route;
    if the probability is between the first threshold and a second threshold higher than the first threshold, determining the driving action to be swerving or changing lanes to move away from a predicted position of the airborne object;
    if the probability is between the second threshold and a third threshold higher than the second threshold, determining the driving action to be stopping the vehicle; and
  performing the driving action.

* * * * *